United States Patent [19]

Biehn

[11] Patent Number: 5,269,446
[45] Date of Patent: Dec. 14, 1993

[54] BICYCLE RACK FOR RECREATIONAL VEHICLE

[76] Inventor: Tim E. Biehn, 1469 N. 800 East, Bountiful, Utah 84010

[21] Appl. No.: 948,296

[22] Filed: Sep. 18, 1992

[51] Int. Cl.$^5$ .............................................. B60R 9/10
[52] U.S. Cl. .......................... 224/42.03 B; 224/42.07
[58] Field of Search .................. 224/42.03 B, 42.06, 224/42.07, 42.03 R

[56] References Cited

U.S. PATENT DOCUMENTS

| | | | |
|---|---|---|---|
| 3,921,869 | 11/1975 | Rogers | 224/42.03 B |
| 4,171,077 | 10/1979 | Richard, Jr. | 224/42.03 B |
| 4,813,584 | 3/1989 | Wiley | 224/42.03 B |
| 5,065,921 | 11/1991 | Mobley | 224/42.03 B |

FOREIGN PATENT DOCUMENTS 3526243  2/1987  Fed. Rep. of Germany ... 224/42.03 B

*Primary Examiner*—Renee S. Luebke
*Attorney, Agent, or Firm*—Terry M. Crellin

[57] ABSTRACT

A bicycle rack is disclosed for supporting a bicycle in an upward standing position at the back end of a vehicle, with the bicycle lying in a plane extending substantially perpendicular from the transverse axis at the back end of the vehicle. The bicycle rack comprises a pair of side-by-side, elongate members spaced from each other so as to receive a tire and rim of a bicycle wheel between the elongate members. The elongate members are mounted to a rear bumper of a vehicle, with the pair of elongate members extending backwardly from the vehicle. A front lateral member extends between the pair of elongate members and lies alongside the front end of the bumper, and a rear lateral member extends between the distal ends of the pair of elongate members. An elongate slot is formed by the front lateral member, the pair of elongate members and the rear lateral member. The slot receives a portion of a rear wheel of a bicycle to cradle the rear wheel in the elongate slot, and the bicycle stands upwardly from the elongate slot along the back side of the vehicle.

11 Claims, 3 Drawing Sheets

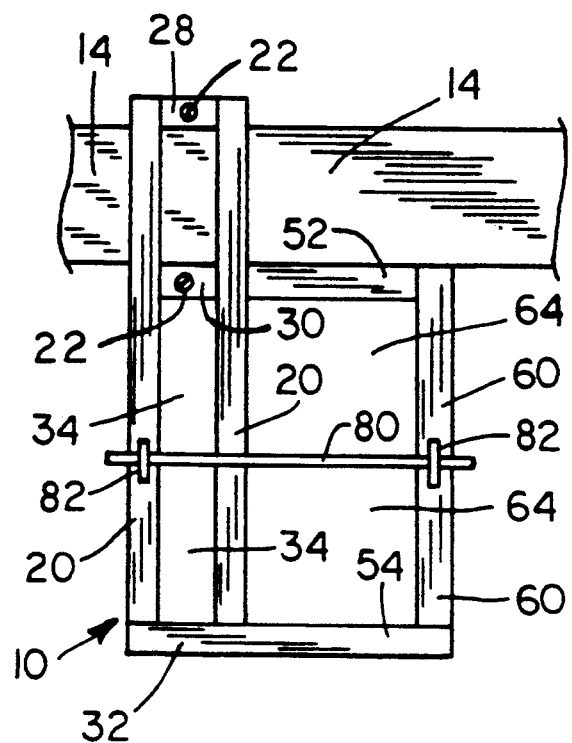
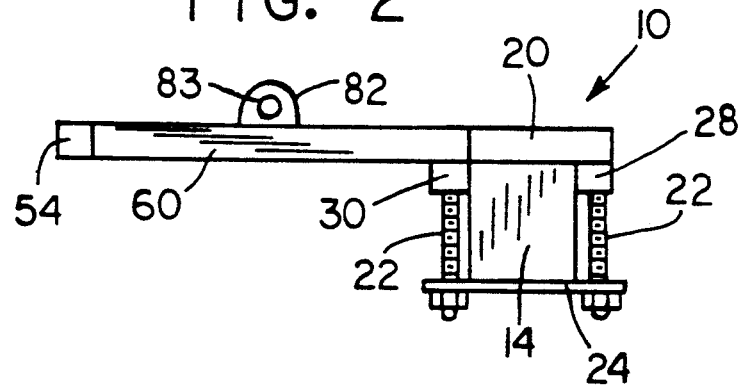
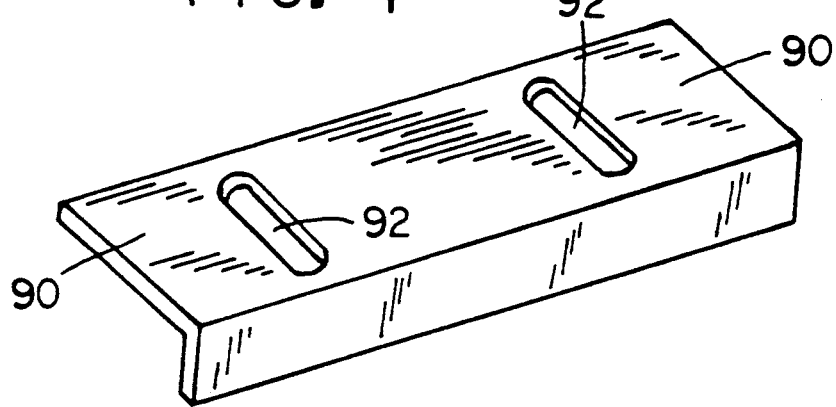

BICYCLE RACK FOR RECREATIONAL VEHICLE

BACKGROUND OF THE INVENTION

1. Field of the Invention

The present invention relates to bicycle racks used in carrying bicycles on a vehicle. More particularly, the invention relates to such racks for carrying bicycles on the back end of a vehicle, including an automobile or a recreational vehicle such as a motor home or travel trailer.

2. State of the Art

Bicycling has become a very popular recreational activity. Various racks have been proposed and sold commercially for carrying bicycles on a variety of vehicles. The racks of the prior art are generally attached to the front end or rear end of a vehicle, such as an automobile or recreational vehicle. Racks for mounting bicycles on the top of automobiles are also common.

Those racks that are attached to the front end or rear end of a vehicle have universally been of the type that support the bicycle or bicycles horizontally along the back end or front end of the vehicle. When carrying a number of bicycles, such racks become unstable due to the leverage developed by the length of the overhang of the bicycles beyond the bumper or end of the vehicle. The weight of the bicycles and the torque developed thereby allow the bicycles to bounce up and down. This movement can harm the bicycles especially when the bicycles are stacked closely together so as to incur repeated contact with each other.

To alleviate the problems encountered with racks attached to the front and rear ends of vehicles, racks have been designed for the top of the vehicle. Several bicycles can be carried in a stable condition on top of the vehicle with the bicycles being securely held in spaced apart positions so that they do not make contact with each other. However, it is rather difficult to lift and mount a bicycle on the top of a vehicle as well as to demount the bicycle from the vehicle.

3. Objectives

A principal objective of the invention is to provide a novel, bicycle rack that is attached to the back end of a vehicle and provides storage of one or more bicycles in a vertically standing position along the back of the vehicle.

A particular objective of the present invention is to provide such a rack in which a cradle is firmly attached to the bumper of a vehicle, with the back tire of the bicycle that is to be carried being received in the cradle so that the bicycle stands upwardly from the cradle along the back of the vehicle.

BRIEF DESCRIPTION OF THE INVENTION

The above objectives are achieved in accordance with the present invention by providing novel, unique bicycle rack that attaches firmly to the back end of a vehicle wherein the bicycle that is to be carried stands upwardly from a tire support member that is firmly attached to the lower end of the vehicle. The bicycle stands upwardly lying in a plane that is substantially perpendicular to the back end of the vehicle. Multiple bicycles can be carried side-by-side along the back end of the vehicle, with none of the bicycles extending any further outwardly from the back end of the vehicle than any of the others.

Each bicycle is supported by its back tire from a support member extending from the back of the vehicle. Each support member need only support the weight of one bicycle, and there is no undue torque applied to the support member by stacking bicycles outwardly from the back end of the vehicle as in the racks of the prior art. Multiple bicycles can be carried in stable, non-bouncing condition, with each bicycle being held out of any contact with any other of the bicycles.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which:

FIG. 2 is an end view of the bicycle carrier of FIG. 1;

FIG. 3 is a top view of another embodiment of a bicycle carrier in accordance with the present invention that is capable of carrying a single bicycle but which can be combined with additional similar racks in a modular system for carrying additional bicycles;

FIG. 4 is a pictorial representation of an elongate angle member that can be used with the racks of the present invention to accommodate various sizes of tires on bicycles;

DETAILED DESCRIPTION OF THE ILLUSTRATED EMBODIMENTS

Figure 6:
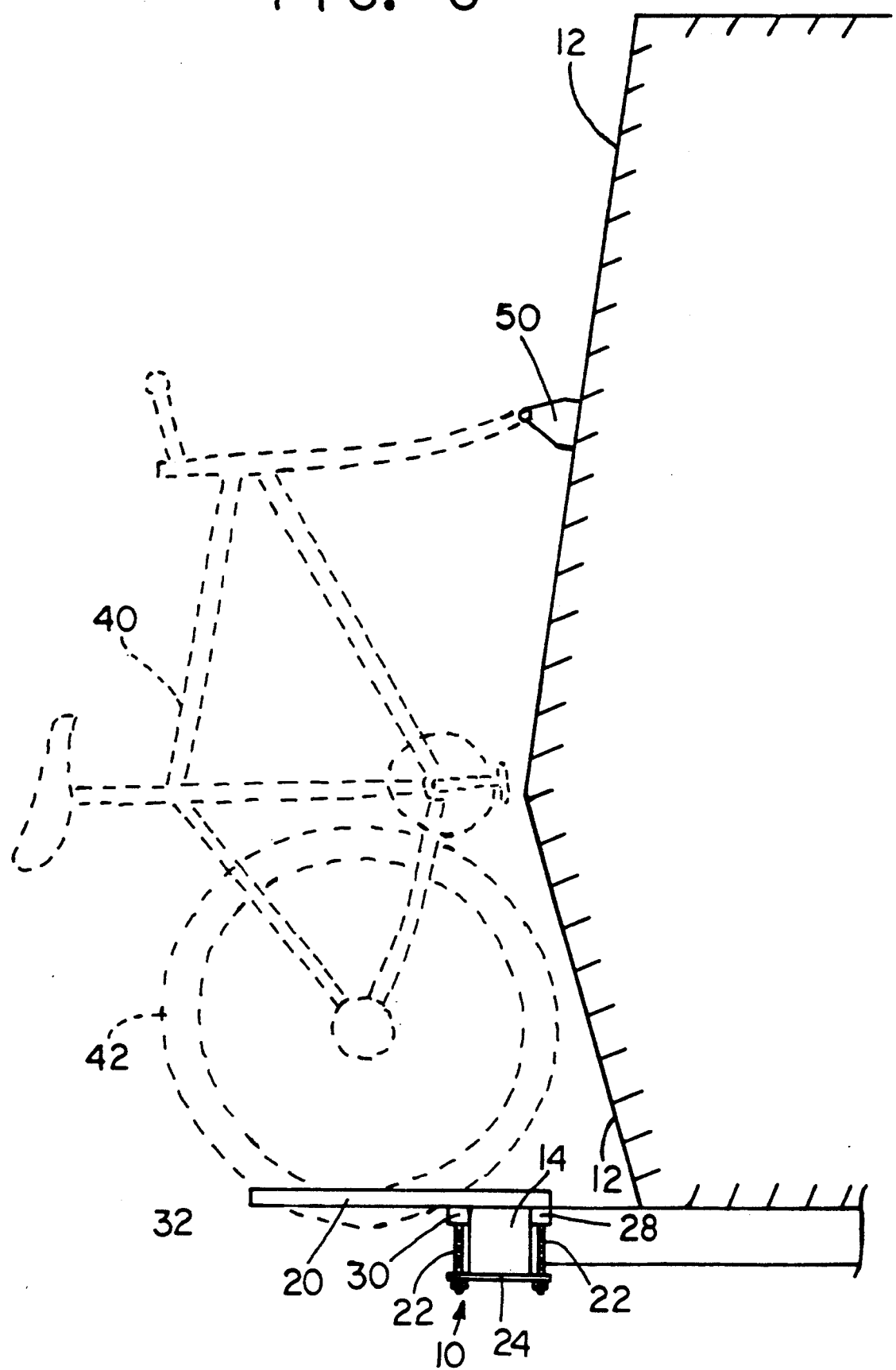
FIG. 6 is a side elevation of the back end of a recreational vehicle having a bicycle rack of the present invention attached thereto, with a bicycle shown in phantom as it would be carried by the rack.

Referring to the drawings, several embodiments are illustrated in the various Figures of bicycle racks 10 in accordance with the present invention. The racks 10 of the present invention are all adapted to support one or more bicycles in an upward standing position at the back end of a vehicle 12 as is best illustrated in FIG. 6. The several embodiments of the rack 10 as shown in the drawings are similar, and like parts of each embodiment will be identified with the same reference number. As used throughout the specification and claims, the word "vehicle" is meant to cover motor vehicles as well as recreation vehicles including motor homes and trailers. The bicycle rack 10 of the present invention is especially useful for use on recreation vehicles of the type including motor homes and travel trailers.

The bicycle rack 10 of the present invention in its broadest form as shown in FIG. 3 includes a pair of side-by-side, elongate members 20 spaced from each other by a distance sufficient to receive a tire and rim of a bicycle wheel between the elongate members 20. Means are provided for mounting the pair of elongate members 20 to a rear bumper 14 of a vehicle such that the pair of elongate members extends backwardly from the vehicle.

As shown in the drawings, the means for mounting the pair of elongate members 20 to the bumper 14 comprises a pair of bolts 22 that extend downwardly from crosspieces that interconnect the pair of elongate members 20. The crosspieces are spaced from each other so as to be located at the front side edge and back side edge of the bumper 14. The pair of bolts 22 extend downwardly from the crosspieces along the front side and back side of the bumper 14, respectively. The pair of elongated members 20 extend along the top of the bumper 14, and a clamp plate 24, which has spaced apart holes that fit overt the lower ends of the bolts 22, abuts against the lower side of the bumper 14. Nuts are threaded on the bolts 22 to clamp the bumper 14 tightly between the clamp plate 24 and the pair of elongate members 20.

The crosspieces that interconnect the pair of elongate members 20 comprise an end crosspiece 28 that is affixed to the proximal ends of the pair of elongate members 20. The associated crosspiece is formed by a front lateral cross member 30 that is affixed to the pair of elongate members 20 and lies closely alongside the front side of the bumper 14. A rear lateral member 32 extends between the distal ends of the pair of elongate members 20. The front lateral member 30, the pair of elongate members 20 and the rear lateral member 32 form an elongate slot 34 that is adapted to receive a portion of a rear wheel 42 of a bicycle 40 (the wheel 42 and bicycle 40 are shown in phantom in FIG. 6).

The rear wheel 42 is cradled in the elongate slot 34, and the bicycle is supported so as to stand upwardly along the back of the vehicle 12 as shown in FIG. 6. The elongate members 20 extend rearwardly from the back end of the vehicle 12 at a substantially perpendicular angle to a transverse plane at the back end of the vehicle. Thus, the bicycle 40 is held upright from the rack 10 and projects substantially perpendicularly to a transverse plane at the back end of the vehicle 12.

As illustrated in FIG. 6, there is advantageously provided means for releasably securing the top, front end of the bicycle 40 to the back of the vehicle 12. As shown, the means for releasably securing the top, front end of the bicycle 40 to the back of the vehicle 12 comprises a fork mount 50 positioned in the upper portion of the backside of the vehicle 12 for securing the fork of the bicycle 40 thereto after the front wheel of the bicycle 40 has been removed. Fork mounts 50 are well known in the art and need not be further described herein.

The bicycle rack 10 is preferably further provided with means for holding the front wheel of the bicycle 40 after the front wheel has been removed from the bicycle. The front wheel itself is not shown in the drawings, but the means for holding the front wheel are illustrated and will now be described. A first elongate projection 52 extends from the front lateral member 30 in a direction outwardly from one of the pair of elongate members 20 alongside a rearward side of the bumper 14 of the vehicle when the pair of elongate members 20 are connected to the bumper 14. A second elongate projection 54 extends from the rear lateral member 32 in a direction outwardly from the one of the pair of elongate members 20 in the same direction as the first elongate projection 52. An elongate connecting member 60 as shown in the embodiment of FIG. 3 is provided to connect the distal ends of the first and second elongate projections 52 and 54. A rectangular shaped cradle 64 that is adapted to receive the front wheel of the bicycle is formed by the pair of elongate members 20, the projections 52 and 54 and the connecting member 60. The front wheel when received in the cradle 64 is supported in an upwardly extending position alongside the bicycle whose rear wheel is supported in the slot 34 of the pair of elongate members 20.

The embodiment of the rack 10 shown in FIG. 3 is designed to carry a single bicycle or as a modular unit that can be combined with second, third and fourth such modular units in side-by-side relationship on the bumper 14 of the vehicle to carry two, three or four bicycles as desired. In the embodiment of the bicycle rack 10 shown in FIG. 1, the rack 10 is formed integrally and extends substantially across the back end of the vehicle. The rack 10 of FIG. 1 is adapted to carry four bicycles.

Figure 1:
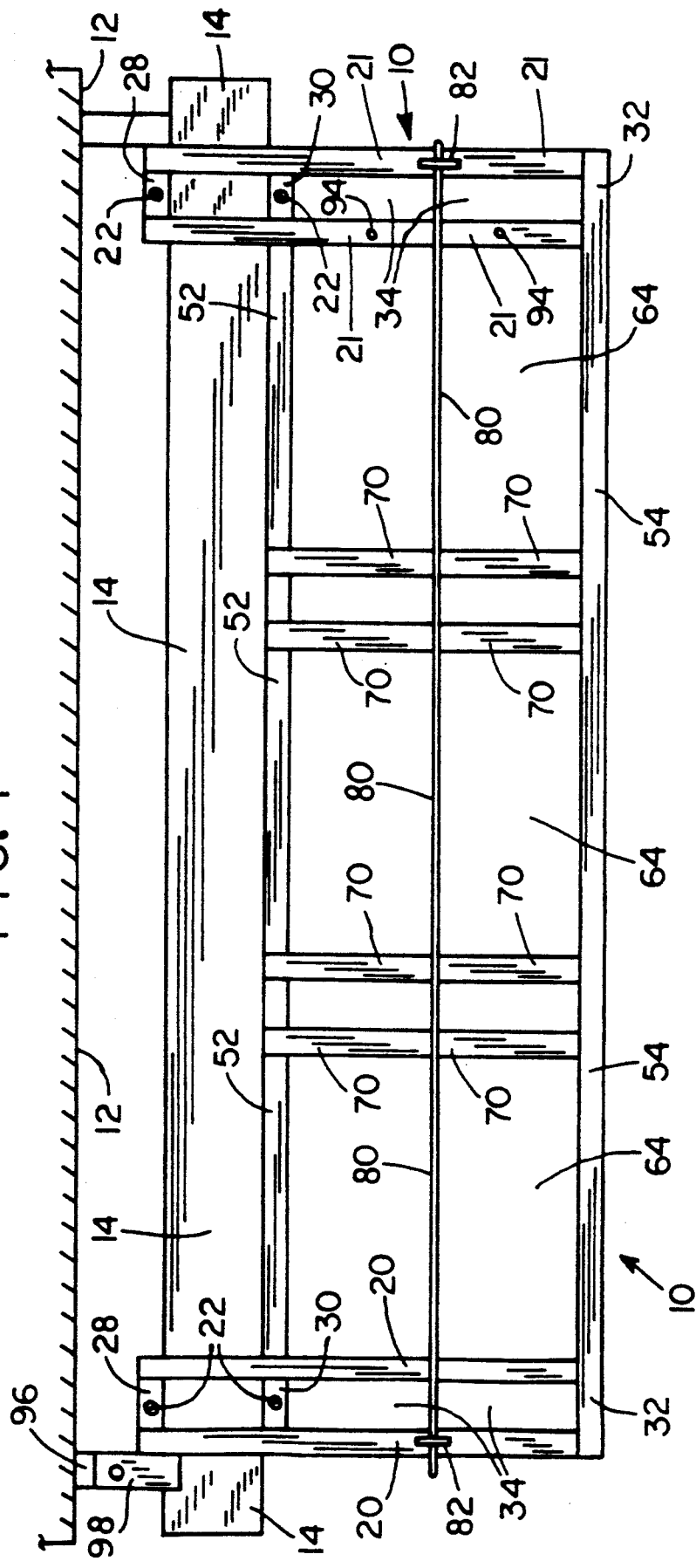
FIG. 1 is a top view of a bicycle carrier in accordance with the present invention that is to be attached to a bumper of a recreational vehicle and has the capacity to carry four bicycles.

In the embodiment of FIG. 1, a second pair of side-by-side, elongate members 21 is provided. The elongate members 21 are spaced from each other by a distance sufficient to receive a tire and rim of a bicycle wheel between them, and means are provided for mounting the second pair of elongate members 21 to the rear bumper 14 such that the second pair of elongate members 21 extend backwardly from the bumper 14 of the vehicle in a direction substantially parallel with the first pair of elongate members 20. The means for mounting the second pair of elongate members 21 to the bumper 14 is similar to the means described previously for mounting the first pair of elongate members 20 to the bumper 14.

As in the embodiment of FIG. 3, the rack 10 shown in FIG. 1 has a first elongate projection 52 that extends from the front lateral member 30 of the first pair of elongate members 20 in a direction outwardly from one of the pair of elongate members 20 alongside a rearward side of the bumper 14 of the vehicle when the pairs of elongate members 20 and 21 are connected to the bumper 14. The distal end portion of the first elongate projection 52 forms a front lateral member 30 that extends between the proximal ends of the second pair of elongate members 21.

Further, as in the embodiment of FIG. 3, the rack 10 shown in FIG. 1 has a second elongate projection 54 that extends from the rear lateral member 32 of the first pair of elongate members 20 in a direction outwardly from the pair of elongate members 20 in the same direction as the first elongate projection 52. The distal end portion of the second elongate projection 54 forms a rear lateral member 32 that extends between the distal ends of the second pair of elongate members 21.

The embodiment of the rack 10 of FIG. 1 is very similar to the embodiment shown in FIG. 3, but is adapted to carry four bicycles instead of one. The major differences between the embodiments of FIGS. 1 and 3 are that the elongate projections 52 and 54 of the embodiment of FIG. 1 are longer than the corresponding members in the embodiment of FIG. 3, and the function of the elongate connecting member 60 of the embodiment of FIG. 3 is performed by the second pair of elongate members 21 in the embodiment of FIG. 1. The second pair of elongate members 21 of the embodiment shown in FIG. 1 take the place of the connecting member 60 of the embodiment of FIG. 3.

In the embodiment shown in FIG. 1, the front lateral member 30, the pair of second elongate members 21 and the rear lateral member 32 form an elongate slot 34 that receives a portion of a rear wheel of a second bicycle, so as to cradle the rear wheel of the second bicycle in the elongate slot 34 and support the second bicycle in a position standing upwardly from the elongate slot 34 in the second pair of elongate members 21.

The first and second pairs of elongate members 20 and 21 are spaced apart by the first and second projections 52 and 54 by a sufficient distance that the front wheels of the first and second bicycles can be positioned side-by-side in an upwardly extending orientation between the first and second bicycles carried at the opposite ends of the rack 10. The first and second projections 52 and 54 and the first and second pairs of elongate members 20 and 21 form a cradle for receiving a portion of the front wheels of the bicycles to support the front wheels in an upwardly extending position as mentioned previously.

To carry additional bicycles (four such bicycles can be carried by the embodiment of FIG. 4), one additional pair of elongate, side-by-side members 70 are mounted at their opposite ends to the first and second projections 52 and 54, respectively, for each additional bicycle that is to be carried. The side-by-side members of each additional pair of elongate members 70 are spaced apart from each other by a distance sufficient to receive a tire and rim of a bicycle wheel between the pair of elongate members 70. To carry three bicycles one additional pair of elongate members 70 are needed. To carry four bicycles two additional pairs of elongate members 70 are provided as illustrated in FIG. 1. The cradles 64 for holding the front tires of the four bicycles carried by the rack 10 of the embodiment of FIG. 1 are formed by the spaces between the spaced apart pairs of elongate members 20, 70 and 21.

In all the embodiments of the rack 10 of the present invention, it is advantageous to provide a lock rod 80 that extends across the rack 10 so as to engage each of the front tires and the rear tires of the bicycles carried thereon. This prevents the tires and the bicycles from being bounced up and down or from being stolen from the rack 10.

Figure 5:
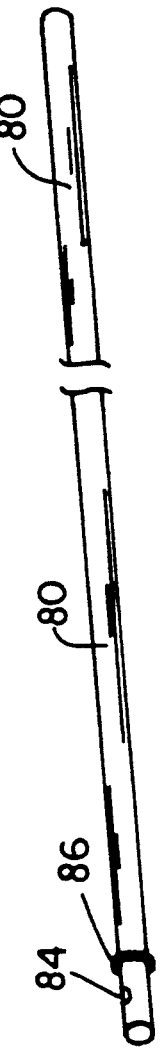
FIG. 5 is a pictorial representation of a lock rod used with the racks of the present invention to lock bicycles carried on the racks securely to the racks.

As shown in the drawings, a tab 82 extends upwardly from each of the pairs of elongate members 20 and 21 at the opposite ends of the rack 10. The rod 80 passes through holes 83 in the tabs 82, and when the rod extends across the rack 10 it passes over the portion of the tires of the bicycles that are cradled in the rack 10 thereby locking the wheels in place on the rack 10. Advantageously, as shown in FIG. 5, the rod 80 has a hole 84 in one of its ends through which a padlock (not shown in the drawings) can be secured. A projection 86 can be affixed permanently to the rod 80 near the hole 84. The projection 86 prevents the rod 80 from passing entirely through the holes 83 in either of the tabs 82. The projection 86 on the rod 80 allows the rod to be locked securely in place with a single padlock through the hole 84 of the rod when the rod is fully engaged in both tabs 82 at the opposite ends of the rack 10. To remove the bicycles and wheels from the rack 10, the padlock is removed and the lock rod 82 withdrawn to its fully withdrawn position wherein the projection 86 thereon abuts the tab 82 at the opposite side of the rack 10.

A simple adjusting member can also be provided for adjusting the width of the slots 34 in the pairs of elongate members 20, 21, and 70. As shown in FIG. 4, the adjusting member is advantageously formed from an elongate piece of angle iron 90 that has two spaced apart, parallel slots 92 formed in one of the flanges of the angle iron 90. Bolt holes 94 can be provided as shown in FIG. 1 in one of each of the pairs of elongate members 20, 21 and 70. The bolt holes 94 are spaced apart by the same distance as between the slots 92 in the angle iron 90. Bolts and nuts (not shown in the drawings) can be used to tightly hold the angle iron 90 in preselected positions to match the width of the wheels of the bicycles that are to be carried on the rack 10.

The rack 10 can be locked to the vehicle 12 so that the rack 10 and its content of bicycles cannot be stolen from the vehicle. As shown in FIG. 1 a lock tab 98 is provided that extends from the rack 10 to a frame member 96 of the vehicle. A padlock hole in the frame member 96 is aligned with a similar hole in the lock tab 98 so that a padlock can be received through the aligned padlock holes.

Although preferred embodiments of a bicycle rack of the present invention have been illustrated and described, it is to be understood that the present disclosure is made by way of example and that various other embodiments are possible without departing from the subject matter coming within the scope of the following claims, which subject matter is regarded as the invention.

I claim:

1. A bicycle rack for supporting a bicycle in a upward standing position at a back end of a vehicle, wherein the bicycle is oriented in a position with its rear wheel lying in a plane that is substantially perpendicular to the back end of the vehicle and with a fork at a front end of the bicycle being located vertically above the rear wheel, said bicycle rack comprising a pair of side-by-side, elongate members spaced from each other by a distance sufficient to receive a tire and rim of a bicycle wheel between said elongate members;

means for mounting said pair of elongate members to the back end of said vehicle such that said pair of elongate members extends backwardly from said vehicle;

a front lateral member that extends between the pair of elongate members and lies alongside a rear bumper of said vehicle;

a rear lateral member that extends between distal ends of said pair of elongate members;

said front lateral member, the pair of elongate members and said rear lateral member forming an elongate slot having a longitudinal axis that extends backwardly from the back end of said vehicle, said elongate slot having a relatively narrow width that is just sufficient to receive a portion of the rear wheel of a bicycle so that the rear wheel of said bicycle is cradled in said elongate slot and the longitudinal axis of said slot is in the plane of the rear wheel, with said bicycle being supported so as to stand upwardly from said elongate slot with the fork at the front end of said bicycle positioned vertically above said rear wheel; and means for releasably securing the front end of said bicycle to the back end of said vehicle.

2. A bicycle rack in accordance with claim 1 wherein the means for releasably securing the front end of said bicycle to the back end of said vehicle comprises a fork mount positioned in an upper portion of the back end of said vehicle for securing the fork of said bicycle thereto after a front wheel of said bicycle has been removed from said fork.

3. A bicycle rack in accordance with claim 1 further comprising a second pair of side-by-side, elongate members spaced from each other by a distance sufficient to receive a tire and rim of a bicycle wheel between said second pair of elongate members;

means for mounting said second pair of elongate members to the back end of said vehicle such that said second pair of elongate members extend backwardly from said vehicle;

a first elongate projection that extends from said front lateral member in a direction outwardly from one of said pair of elongate members alongside said rear bumper of said vehicle when the pair of elongate members are connected to said vehicle, with a distal end portion of said first elongate projection forming a second front lateral member that extends between proximal ends of said second pair of elongate members;

a second elongate projection that extends from said rear lateral member in a direction outwardly from said one of said pair of elongate members in the same direction that said first elongate projection extends from said one of said pair of elongate members, with a distal end portion of said second elongate projection forming a second rear lateral member that extends between distal ends of said second pair of elongate members;

said second front lateral member, the pair of second elongate members and said second rear lateral member forming a second elongate slot that extends backwardly from the back end of said vehicle, with said second elongate slot receiving a portion of a rear wheel of a second bicycle so that the rear wheel of said second bicycle is cradled in said second elongate slot, with said second bicycle being supported so as to stand upwardly from said second elongate slot alongside said first bicycle; and means for releasably securing a front end of said second bicycle to the back end of said vehicle.

4. A bicycle rack in accordance with claim 3 wherein the means for releasably securing the front end of said second bicycle to the back end of said vehicle comprises a second fork mount positioned in an upper portion of the back end of said vehicle for securing a fork of said second bicycle thereto after a front wheel of said second bicycle has been removed from said fork of said second bicycle.

5. A bicycle rack for supporting a bicycle in an upward standing position at a back end of a vehicle, said bicycle rack comprising a pair of side-by-side, elongate members spaced from each other by a distance sufficient to receive a tire and rim of a bicycle wheel between said elongate members;

means for mounting said pair of elongate members to the back end of said vehicle such that said pair of elongate members extends backwardly from said vehicle;

a front lateral member that extends between the pair of elongate members and lies alongside a rear bumper of said vehicle;

a rear lateral member that extends between distal ends of said pair of elongate members;

said front lateral member, the pair of elongate members and said rear lateral member forming an elongate slot that receives a portion of a rear wheel of a bicycle so as to cradle the rear wheel in said elongate slot and support said bicycle to stand upwardly from said elongate slot; and means for releasably securing the front end of said bicycle to the back end of said vehicle, wherein the means for releasably securing the front end of said bicycle to said back of said vehicle comprises a fork mount positioned in an upper portion of the back end of said vehicle for securing the fork of said bicycle thereto after a front wheel of said bicycle has been removed from said fork.

6. A bicycle rack in accordance with claim 3 wherein means is further provided for holding said front wheel after it has been removed from said bicycle, said means for holding said front wheel comprising a first elongate projection extending from said front lateral member in a direction outwardly from one of said pair of elongate members alongside a rearward side of said bumper of said vehicle when the pair of elongate members are connected to said bumper;

a second elongate projection extending from said rear lateral member in a direction outwardly from said one of said pair of elongate members in the same direction as said first elongate projection extends from said one of said pair of elongate members; and an elongate connecting member that connects the distal ends of said first and second elongate projections, whereby said first and second projection, said elongate connecting member and said one of said pair of elongate members forms a cradle for receiving a portion of said front wheel and supports said front wheel in an upwardly extending position alongside said bicycle.

7. A bicycle rack in accordance with claim 3 further comprising a second pair of side-by-side, elongate members spaced from each other by a distance sufficient to receive a tire and rim of a bicycle wheel between said second pair of elongate members;

means for mounting said second pair of elongate members to the back end of said vehicle such that said second pair of elongate members extend backwardly from said vehicle;

a first elongate projection that extends from said front lateral member in a direction outwardly from one of said pair of elongate members alongside said rear bumper of said vehicle when the pair of elongate members are connected to said vehicle, with a distal end portion of said first elongate projection forming a second front lateral member that extends between proximal ends of said second pair of elongate members;

a second elongate projection that extends from said rear lateral member in a direction outwardly from said one of said pair of elongate members in the same direction that said first elongate projection extends from said one of said pair of elongate members, with a distal end portion of said second elongate projection forming a second rear lateral member that extends between distal ends of said second pair of elongate members;

said second front lateral member, the pair of second elongate members and said second rear lateral member forming a second elongate slot that receives a portion of a rear wheel of a second bicycle so as to cradle the rear wheel of said second bicycle in said second elongate slot and support said second bicycle to stand upwardly from said second elongate slot; and means for releasably securing the front end of said second bicycle to the back end of said vehicle comprising a second fork mount positioned in an upper portion of the back end of said vehicle for securing a fork of said second bicycle thereto after a front wheel of said second bicycle has been removed from said fork of said second bicycle.

8. A bicycle rack in accordance with claim 7 wherein said first and second pairs of elongate members are spaced apart by said first and second projections by a sufficient distance such that the front wheels of said first and second bicycles can be positioned side-by-side between said first and second bicycles and whereby said first and second projections and said first and second pairs of elongate members forms a cradle for receiving a portion of said front wheels of said first and second bicycles to support said front wheels in an upwardly extending position between said first and second bicycles.

9. A bicycle rack in accordance with claim 7 wherein at least one additional pair of elongate, side-by-side members are mounted at their opposite ends to said first and second projections, respectively, with the side-by-side members of each said additional pair of elongate members being spaced apart from each other by a distance sufficient to receive a tire and rim of a bicycle wheel between said additional pair of elongate members, and with each said additional pair of elongate members being spaced from other pairs of elongate members such that an additional bicycle can be supported from each such pair of elongate members to stand upwardly from said pair of elongate members.

10. A bicycle rack in accordance with claim 9 further including means for releasably securing the front end of each said additional bicycle to the back end of said vehicle.

11. A bicycle rack in accordance with claim 10 wherein the means for releasably securing the, front ends of the respective additional bicycles to said back end of said vehicle comprises fork mounts positioned in the upper portion of the backside of said vehicle for securing the folks of each of the respective additional bicycles to the fork mounts after the front wheels of the additional bicycles have been removed.

* * * * *